Oct. 5, 1937.　　O. P. M. GOSS ET AL　　2,094,885
BRIQUETTE MACHINE
Filed Sept. 19, 1934　　8 Sheets-Sheet 1

INVENTOR
OLIVER P. M. GOSS
WORTH C. GOSS
BY
Cook & Robinson
ATTORNEY

Oct. 5, 1937.     O. P. M. GOSS ET AL     2,094,885
BRIQUETTE MACHINE
Filed Sept. 19, 1934     8 Sheets-Sheet 2

INVENTOR
OLIVER P. M. GOSS
WORTH C. GOSS
BY
Cook + Robinson
ATTORNEY

Patented Oct. 5, 1937

2,094,885

UNITED STATES PATENT OFFICE 2,094,885

BRIQUETTE MACHINE

Oliver P. M. Goss and Worth C. Goss,
Seattle, Wash.

Application September 19, 1934, Serial No. 744,648

7 Claims. (Cl. 25—12)

This invention relates to machines for compressing loose, finely divided material, such as sawdust and the like, into briquettes to be used for fuel; it being the principal object of this invention to provide a machine for the above stated purpose that is designed for a rapid, continuous and fully automatic operation and whereby the finely divided material will be fed from a source of supply and accurately weighed charges thereof delivered successively into a press chamber and therein compressed into briquettes by the timed, reciprocal actions of a ram coacting with the chamber. Also, to provide means for effecting a pre-determined relative movement of the press chamber along a stripper plunger, after the formation of each briquette, thereby to eject the briquette therefrom.

It is also an object of this invention to provide a machine for the above stated purpose including means whereby exceedingly high pressure for compressing the material may be developed and the power input converted without material loss into the work of forming the briquettes.

It is also an object of the invention to provide a dual means for weighing and delivering the charges of material into a loader cylinder for advancement by a ram into the press chamber and to arrange them for alternate actuation, thereby to expedite the formation of briquettes by reason of the weighing of one charge ready for delivery while the one preceding it is being compressed. Also, to provide means associated with the delivery of fuel charges, whereby they are partially compressed incident to their being advanced into the loader cylinder thereby materially lessening the length of stroke of the ram that otherwise would be required for effecting a desired compression of the material.

Still another object of the invention resides in the novel mode of use of a toggle mechanism for actuating the ram and through which toggle mechanism a uniform input of power is increasingly applied as each charge of material in the formation of a briquette therefrom approaches its maximum state of compression.

Still further objects of the invention reside in the provision of means for maintaining the supply of material in a heated condition until delivered into the press chamber and in the provision of means for circulating a cooling medium about the press chamber to keep it from overheating.

Other objects of the invention reside in the details of construction of the press cylinder, especially in the provision of means for venting to provide for exhaustion of air from the material under compression.

In accomplishing these and other objects of the invention, we have provided the improved details of construction, the preferred forms of which are illustrated in the accompanying drawings, wherein—

Briefly described, the present machine comprises two feed hoppers arranged to receive material by gravity flow from a source of supply. Associated with the hoppers are control mechanisms whereby weighed charges of material are delivered alternately from the hoppers into a passage leading into a loader cylinder. A loader plunger is reciprocally movable in this passage in proper timing with delivery of charges, to advance them into the loader cylinder and thereby to partially compress them. A ram is fitted in the loader cylinder and is reciprocally actuated in timing with reception of partly compressed charges, to advance them into a press chamber located in registering alinement with the loader cylinder and therein to compress each charge to its maximum amount to form a briquette. Incident to each retractive movement of the ram, the press chamber is moved away from the loader cylinder for ejection of the formed briquette, and this is effected by the movement of the press chamber over a stripper plunger. Coincident with retraction of the ram and lifting of the loader plunger, another charge of material is delivered into the loader cylinder.

Movement of the ram is effected by actuation of a toggle mechanism that is arranged to apply power for compression as the briquette approaches its maximum amount of compression. Also, hydraulic cylinders are arranged for operation of the various plungers, the ram and other power devices under automatic control of valve devices which in turn are under control of electrical means whereby all operations are accurately timed in accordance with movement of the parts.

Referring more in detail to the drawings—

Figures 1, 2:
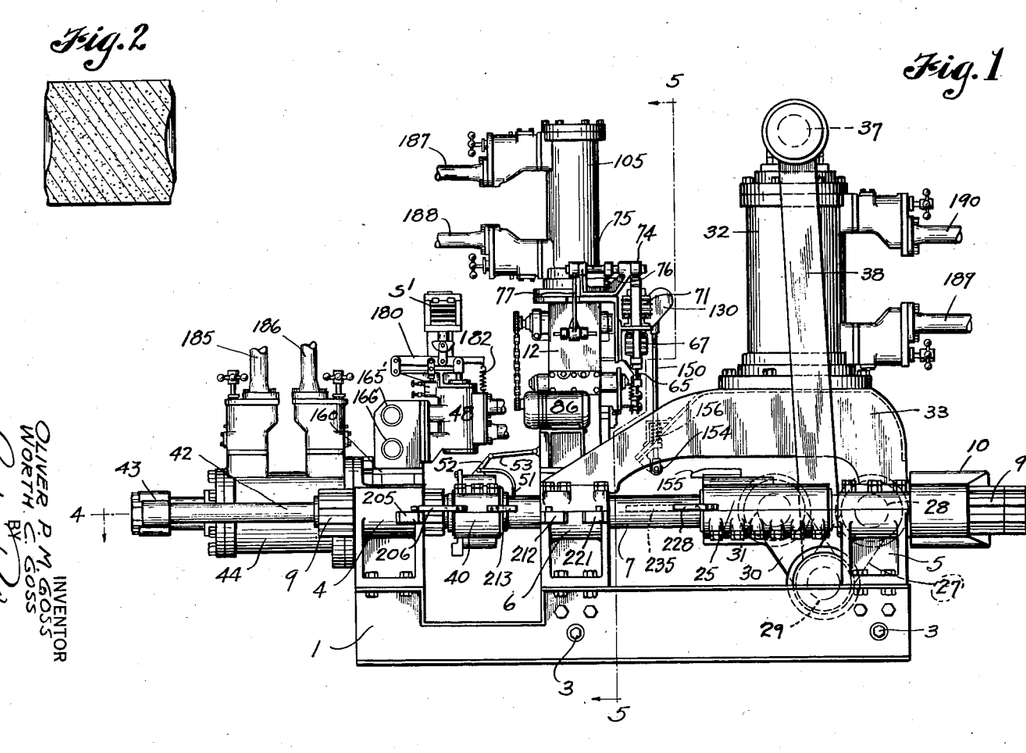
Fig. 1 is a side elevation of a briquette forming machine embodying the present invention, the pipe connections between the various control valves and hydraulic cylinders being broken away for better illustration of parts otherwise covered thereby.
Fig. 2 is a sectional view axially of a briquette formed by the machine.

The base structure of the machine comprises two parallel, horizontally disposed channel beams 1 and 2, joined rigidly in spaced relation by a plurality of tie rods 3 and by three transversely disposed yokes 4, 5, and 6; the opposite ends of which yokes rest upon and are bolted to the beams 1 and 2 at the opposite ends of the frame and at a point medially thereof, respectively. Also, the three yokes are rigidly and substantially tied together by shafts 7 and 8 that extend longitudinally along opposite sides of the frame through the yokes and which have nuts 9 at their ends to secure them in place and withstand the thrust exerted by the toggle mechanism in the operations of compressing the briquettes. Also, at the right hand end of the machine, as seen in Fig. 1, a cross beam 10 is mounted by the ends of the shafts 7 and 8 and to this beam, one end of the toggle mechanism is pivotally attached, as will presently be explained.

Figures 5, 5A:
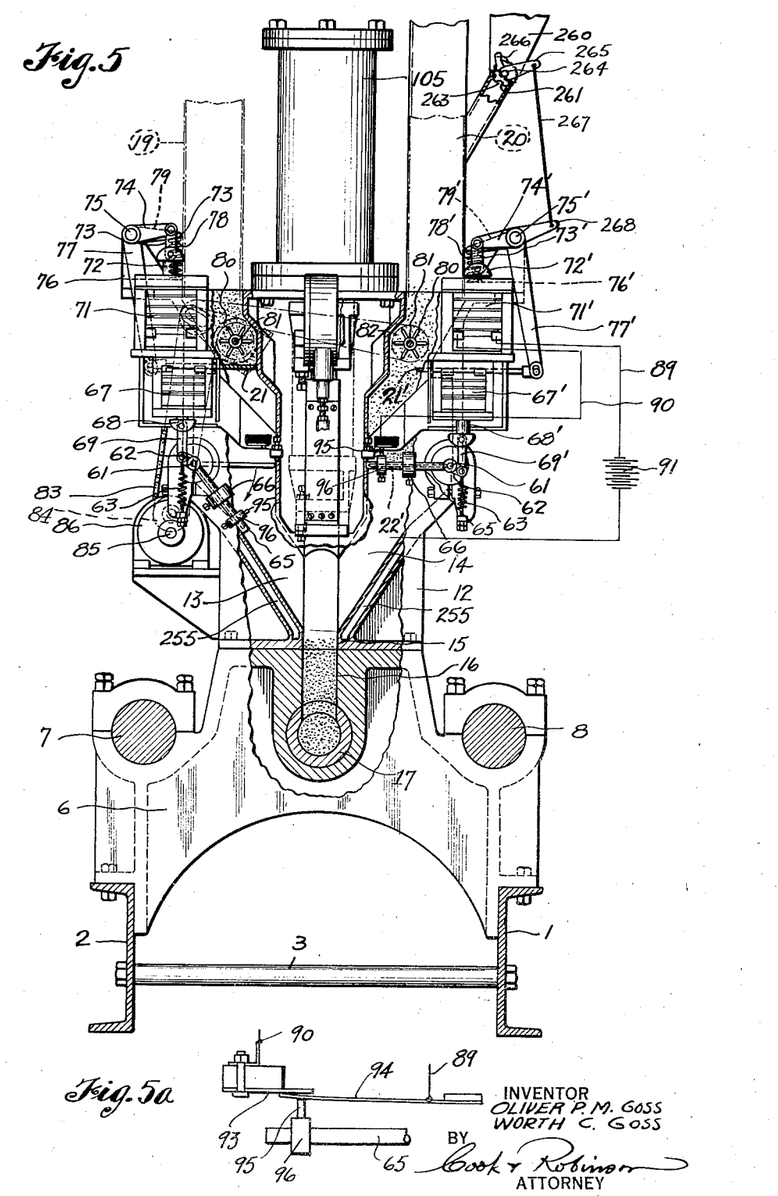
Fig. 5 is a cross section, substantially on line 5—5 in Fig. 1, with parts of the feed hoppers broken away for better illustration of parts enclosed therein and showing diagrammatically the circuit of certain solenoids.
Fig. 5a is a detail of a switch mechanism as used in the circuits diagrammatically shown in Fig. 5.
Figure 6:
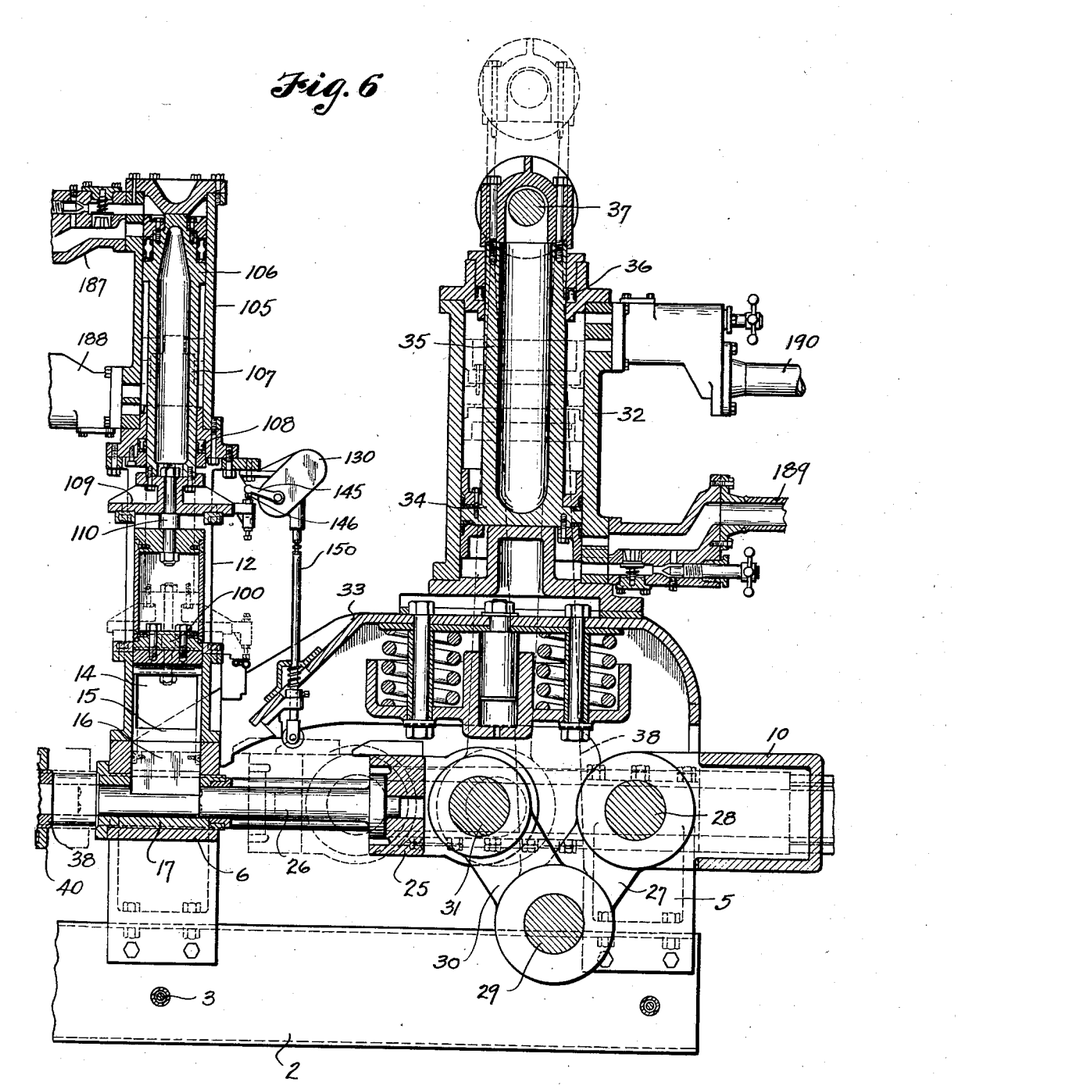
Fig. 6 is a vertical section, taken longitudinally of the machine and showing particularly the toggle mechanism; the hydraulic cylinder associated therewith and its control valve; also showing the loader plunger and parts for controlling the operation.

The yoke 6 of the frame structure mounts centrally thereon, as disclosed best in Fig. 5, the hoppers and dual feed mechanisms whereby the material for the briquettes is weighed and delivered to the loader cylinder. These mechanisms are mounted by a frame structure 12 bolted upon yoke 6. The frame forms a pair of spaced hoppers 13 and 14 which converge downwardly to an outlet 15, common to both and which leads into a vertical passage 16 opening into the top of the horizontally disposed loader cylinder 17, that is centrally fixed in the yoke 6, as shown in Figs. 5 and 6.

The two hoppers, 13 and 14, have connection at their upper ends, respectively, with conduits 19 and 20 leading from a source of supply of material. Within the hoppers are horizontally disposed sliding gate valves 21 and 21' under automatic control, as presently described, for permitting or cutting off delivery of material from their respective hoppers onto weighing valves 22 and 22' located farther down in the hoppers; it being understood that when a gate valve is opened, material will flow downwardly onto the closed weighing valve and that the latter, under a certain weight, will move slightly downward by reason of its mounting, thereby to effect the closing of a circuit to actuate mechanism for closing the gate valve. Finally, the weighing valve is dumped to deliver its weighed charge into the loader cylinder.

A cross head 25 located between the yokes 5 and 6 is reciprocally supported on the shafts 7 and 8, and mounted thereby is a ram 26 that is coaxially of and is slidably fitted in the loader cylinder 17. Reciprocal action of the cross head effects a reciprocal action of the ram. Actuation of the cross head is effected by operation of the previously mentioned toggle mechanism which comprises a pair of parallel links 27—27 with outer ends connected, by a pivot pin 28, with the cross beam 10 and their inner ends connected by a pivot pin 29 with one end of a link 30 which has its other end connected by pivot pin 31 with the cross head 25.

For actuating the toggle there is provided a vertically disposed hydraulic cylinder 32 rigidly mounted upon a frame structure 33 extending between and fixed to the yokes 5 and 6 centrally over the toggle mechanism. Within the cylinder is a reciprocally contained piston 34 having a rod 35 extended from the upper end of the cylinder through a suitably packed gland 36 and at its outer end mounting a horizontal pivot pin 37 to which the upper ends of a pair of links 38—38 are connected. These links depend along opposite sides of the cylinder 32 and at their lower ends connect pivotally with the opposite ends of the toggle pin 29. Thus, incident to reciprocal action of the piston 34 in cylinder 32, the toggle is actuated between the downwardly broken position of Fig. 6, to its extended position which is the maximum when the pivot 29 is in dead center alinement between pivots 28 and 31. Actuation of the piston is under control of a hydraulic valve 39 presently described, which in turn is automatically controlled by a solenoid $S^3$ operated in accordance with movement of the loader plunger and ram.

When the piston 34 is in lowered position, as seen in Fig. 6, the effective length of the toggle is such that the ram 26 is withdrawn from the cylinder 17 to a position at which its inner end is out of the path of delivery of material into the loader cylinder through the passage 16.

Figure 4:
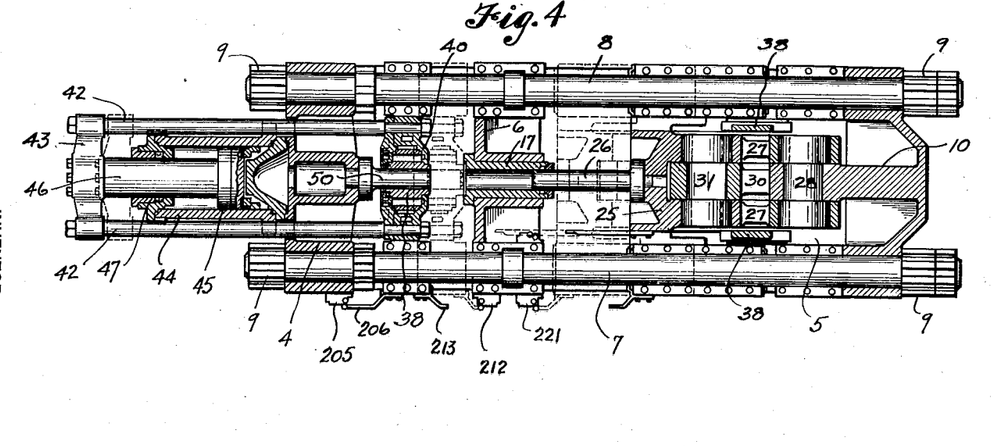
Fig. 4 is a horizontal section, as seen on the line 4—4 in Fig. 1.

By reference to Fig. 4, it will be observed that there is a cross head 40 with opposite ends reciprocally supported on the shafts 7 and 8 between the yokes 4 and 6. This cross head mounts the press chamber 38 centrally thereof. The press chamber is of cylindrical form open at its ends and is coaxially alined with the loader cylinder 17 and is of the same interior diameter. Furthermore, it is adapted to be moved by the cross head 40 against and away from the end of cylinder 17 as indicated by the dotted line and full line showing thereof in Fig. 4. When moved into end abutment with cylinder 17, the chamber 38 has its inner end seated in an annular socket, or seat, 41 provided therefor in the end of cylinder 17 to hold the two parts in exact alinement.

The cross head 40 is reciprocally actuated on its supporting shafts 7 and 8 by a pair of parallel rods 42—42, with end connected therewith, as seen in Fig. 4, and their other ends fixed in opposite ends of a cross head 43. A hydraulic cylinder 44 is rigidly fixed to the yoke 4, in the central longitudinal line of the machine and between the rods 42—42. A piston 45 is reciprocally contained in the cylinder and this has a rod 46 extending from the outer end of the cylinder through a packed gland 47 and fixed at its outer end to the cross head 43, thus, reciprocal action of the piston 45 in its cylinder causes that reciprocal movement of the cross head 40 whereby the press chamber 38 may be moved inwardly against the end of cylinder 17 to receive a charge of material therefrom under action of ram 26, and then moved outwardly away from the loader cylinder for ejection of the briquette formed therein by the ram. Movement of the piston 45 is under control of a valve mechanism 48 which controls admittance of hydraulic medium to and from the ends of the cylinder, and the valve is under control of a solenoid S¹ which is operated by the action of the cross head 40 and ram, as presently described.

In order to effect the stripping of the briquette from the press chamber incident to its movement away from the loader cylinder, a stripper plunger 50 is fixed in the yoke 4 and extends coaxially of the press chamber and is fitted therein so as to permit the chamber to move reciprocally thereon. It is apparent that since the plunger 50 is stationary, the briquette may be actually pushed from the chamber by shifting of the cross head 40 to the position of Fig. 4 at which the plunger extends clear through the press chamber.

It will be mentioned here that when the press chamber 38 is in registering position against the end of cylinder 17 to receive a charge of material, the stripper plunger 50 is withdrawn sufficient for the formation of the briquette entirely within the chamber, and when the ram 26 is fully extended for the compression of a charge, it extends well into the chamber 38. Thus the briquette is compressed between the ends of the ram 26 and plunger 50. The end surfaces of these parts are given a special form whereby the ends of the briquettes are rounded slightly outwardly with a central depression which, in its formation, causes a greater compression to be applied to the briquettes along their axial lines; the cross sectional shape of the briquette B, as formed in the chamber being shown in Fig. 2.

Figures 7, 8, 9, 9A, 10:
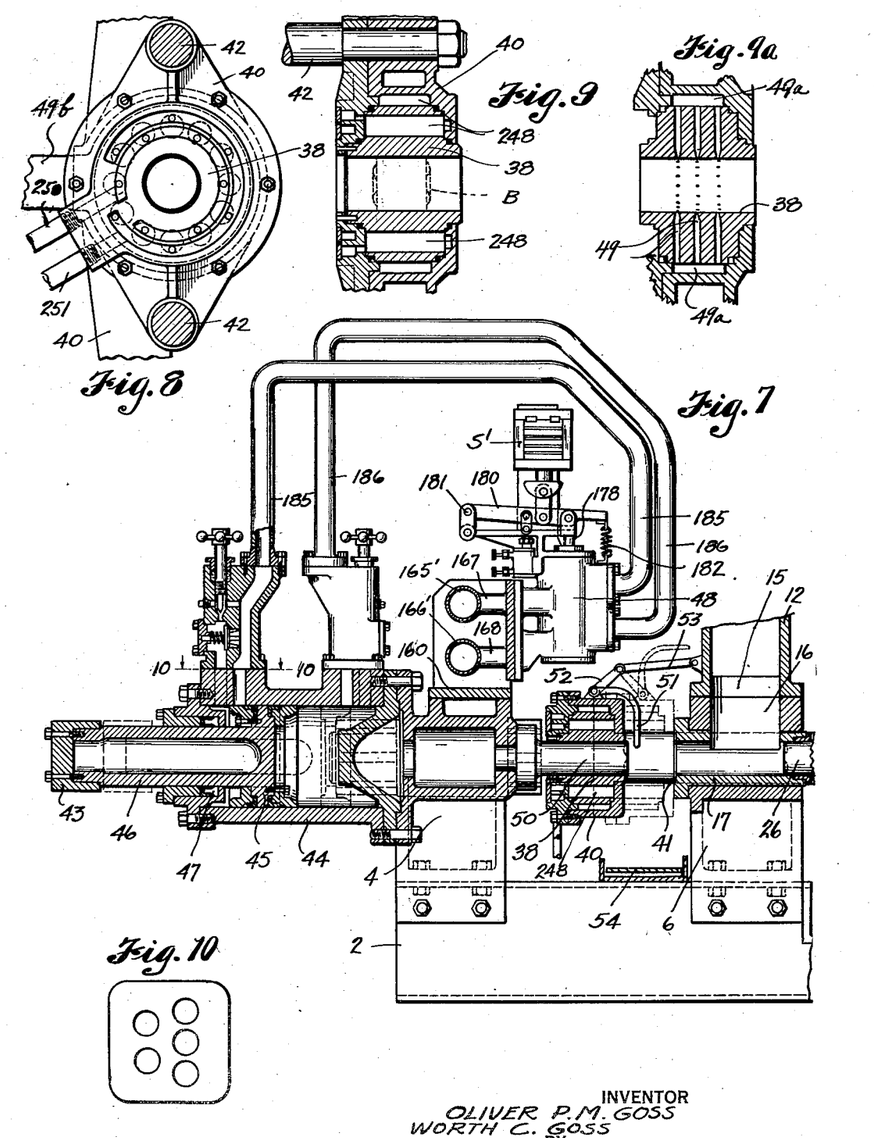
Fig. 7 is a sectional view, in a vertical plane, of the press chamber, the stripper and its actuating and control means.
Fig. 8 is a horizontal cross section of the cross head which mounts the press chamber.
Fig. 9 is an end view of the same.
Fig. 9a is a sectional detail of the press chamber showing the air vents.
Fig. 10 is a sectional view in the horizontal plane of line 10—10 in Fig. 7.

An important feature of construction of the press cylinder is shown in Fig. 9a, wherein is illustrated the provision of ports for the exhaustion of occluded air from the briquette material as it is placed under high compression. It was found that, under the extremely high compression at which these briquettes are made, it was necessary that all air be permitted to escape therefrom or else it would expand, on retraction of the plunger, to an extent sufficient to crack the briquette. Therefore, the chamber walls are provided with minute ports 49, closely placed and leading into the chamber in tapered passages, so that material will not clog or stick in the port. The outer ends of the ports connect with an annular passage 49a encircling the chamber, and this is connected at one side with a suction pipe 49b, as seen in Fig. 8, whereby any material ejected into the passages will be withdrawn.

Assuming, then that a charge of material has been delivered into the loader cylinder 17 from hopper 13 or hopper 14, it is apparent that an inward movement of the ram 26, resultant to a straightening out of the toggle mechanism will cause the charge to be pushed ahead of the plunger into the press chamber 38, which is then located in registering alinement with the cylinder 17, and therein compressed into a briquette of definite size. Then an outward shifting of the chamber 38 along the plunger 50 will cause ejection of the formed briquette from the chamber.

Since there is a tendency of the briquette to stick to the end of the ejector plunger, we have provided means for knocking it loose. This means, as shown best in Fig. 7, comprises an angular lever 51 pivotally mounted on cross head 40 and equipped with an arm 52 connected by a link 53 with the frame 12. The arrangement provides that incident to outward shifting of the cross head 40, the lever 51 will swing downwardly and strike the briquette at the time it is completely ejected, thus to release it from the stripper. A trough 54 may be located in position to receive the briquettes.

Referring now to the hopper mechanism and those devices for weighing and delivering the charge of material to the loader cylinder 17 for partial compression and delivery to the press chamber, it is observed by reference to Fig. 5 that the slide gates 21 and 21' are located at short distances below the upper ends of the hopper passages, and somewhat below these valves are the downwardly swinging gate valves 22 and 22'. These latter valves are fixed on horizontal shafts 61 revolubly supported in the hopper walls. Also, fixed on each shaft 61, outside the hopper, is a short lever arm 62 to which coiled springs 63 are attached in a manner to yieldingly hold the valves in closed position. Also fixed on the shafts 61 outside the hopper, are levers 65 along which counter-weights 66 are adjustable. Fixed to the frame structure 13 above each of these lever mechanisms, are solenoids 67 and 67' with armatures 68 and 68' connected, respectively, by links 69 and 69' with the lever arms 62; the arrangement being such that on energization of a solenoid 67 or 67', its armature will be moved upwardly and will thereby actuate the corresponding valve 22 to open position. On de-energization of the solenoid, the spring 63 pulls the valve back to closed position.

The gate valves 21 and 21' are slidably mounted and are moved inwardly and outwardly under control of solenoids 71 and 71' that are also supported on the frame 13. The solenoids have armatures 72 and 72' connected by links 73 and 73' with lever arms 74 and 74' on rock shaft 75 and 75'; the rock shafts being mounted in brackets 76 and 76' attached to the frame 13 as shown in Fig. 1. Fixed to the rock shafts are downwardly extending lever arms 77 and 77' operatively attached at their lower ends, respectively, to their corresponding valves 21 and 21'. Springs 78 and 78', held under compression, bear upwardly against lever arms 79 and 79' fixed on the rock shafts and thereby yieldingly hold the valves in closed position, but on energization of a solenoid, its armature is drawn in, thereby actuating its corresponding rock shaft to swing the lever arm 77 or 77' outwardly to open the valve 21 or 21' associated therewith.

Located in the hoppers above the slide valves, are agitator wheels 80 fixed on shafts 81 extended to the outside of the hoppers and there equipped with sprocket wheels 82. A sprocket chain belt 83 operates over these sprockets and also about a driving sprocket 84 operated by the drive shaft 85 of an electric motor 86, to keep the agitator wheels in operation and thereby to insure a ready flow of material when valves 21 are opened.

Assuming that the swinging valve of a hopper is in closed position and that its sliding gate should be opened, it is quite apparent that material will be fed onto the valve and will form a pile thereon. It is also apparent that, by a proper tensioning of the spring 63 and by properly locating the counterweight 66 on lever arm 65, a predetermined weight of material on the gate in addition to the pull of the counterweight, may be made to overcome pull of the spring 63 to an extent whereby the swinging end of lever 65 will move slightly downward. In the present arrangement it is provided that such downward movement of a lever 65 opens a switch in an electric circuit thereby to effect de-energization of the corresponding solenoid 71 or 71' to cause an instant closing of the gate valve, thereby to hold back any additional delivery of material until the weighed charge had been dumped and the weighing valve again brought back to closed position. In this way definite and exact amounts of material are used for each briquette and briquettes of definite, uniform size are made and all will have uniform compression.

To provide this desired operation, each of the solenoids 71 and 71' is connected electrically in a switch controlled circuit, as illustrated in Fig. 5. 89 and 90 designate connections whereby the solenoid of each circuit is electrically connected through a switch with a source of electricity 91. Each switch, as shown in Fig. 5a, comprises a fixed contact 93 and a yielding switch lever 94 that is located in such position that it will be held against the contact 93 by a stud 95 fixed in a nut 96 on the lever 65 of the corresponding gate valve when the latter is closed. However, when sufficient material has been delivered onto the valve that the weight thereof overcomes the spring 63, and permits the lever 65 to move downwardly, and the contact 94 to disengage contact 93, and the circuit to the solenoid is thereby opened and the slide valve 21 corresponding thereto is actuated to closed position.

It is to be understood that the slight downward movement of a gate valve 22 incident to its being loaded to a predetermined weight, does not cause the charge to be dumped but only effects the closing of the slide valve. However, a loaded valve 22 is dumped in proper timing, by the energization of its respective solenoid 67 or 67' under control of the reciprocal movements of a loader plunger 100 that is movable in a centrally located, vertical guideway 101 in the frame structure 12. This plunger, in raised position, uncovers the hopper outlets to the passage 16, and when actuated downwardly will partially compress a charge of material that may have been dumped incident to its upward travel, and to advance the charge into the loader cylinder 17. When the loader plunger 100 is in its lowered position, it is contained in passage 16 and its lower surface, which conforms in curvature, as shown in Fig. 5, to the curvature of the cylinder 17, registers evenly with the wall of the cylinder and closes the passage 16. Then when the ram 26 advances, the loaded charge is pushed thereby into the press chamber 38.

Mounted upon the frame 12 is a vertically disposed, hydraulic cylinder 105 containing a piston 106 having its rod 107 extending from the lower end of the cylinder through a suitably packed gland 108. The piston rod is connected at its lower end to a cross head 109 and this, in turn, is connected by a bolt 110 to the upper end of the loader plunger. Reciprocal action of the piston causes a corresponding actuation of the loader plunger; movement of the piston being under control of a hydraulic valve mechanism 111 presently described, which controls the admittance of hydraulic pressure medium to the cylinder. The valve 111 is under automatic control of a solenoid $S^2$ as presently described.

Since it is desired that the weighed charges of material shall be delivered alternately from the hoppers 13 and 14 into the loader cylinder, the valves 22 and 22' must be actuated alternately in accordance with the operation of the loader plunger 100. The two valves 22 and 22' are under control of their respective solenoids 67 and 67' and these are under control of switch mechanisms whereby first one and then the other is energized.

Figures 12, 13, 14:
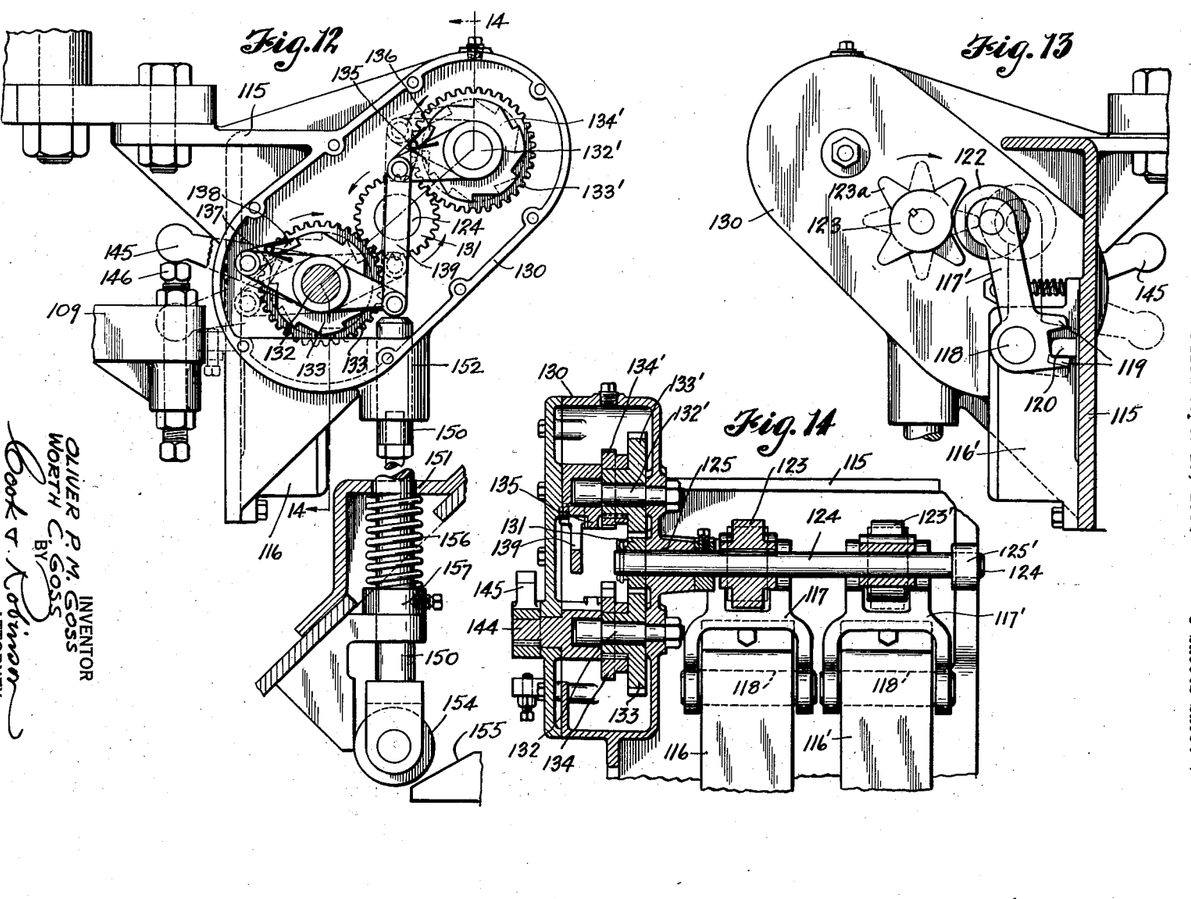
Fig. 12 is an elevation of the control mechanism for effecting alternate operation of the weighing valves.
Fig. 13 is a side view of the switch operating mechanisms operated by the control means shown in Fig. 12.
Fig. 14 is a section taken on line 14—14 in Fig. 12.

The switches for these solenoids and their actuating mechanisms under control of the movements of plunger 100, are shown in Figs. 12, 13, and 14 wherein 115 designates a bracket that is fixed rigidly to one side of frame 12. Mounted on the bracket are switches 116 and 116', each of which has electrical circuit connection with its respective solenoid, and is arranged to be operated, respectively, by lever arms 117 and 117', pivotally mounted, as at 118 in Fig. 13, in the switch housings; one end of each lever being provided with laterally extending yoke arms 119 engaging a lug 120 of the switch for moving it between "on" and "off" positions and the other end of the levers having rollers 122 mounted thereon to be engaged, respectively, by cams 123 and 123', fixed on the outer end of a shaft 124 revolubly mounted in bearings 125 and 125' on the bracket. The cams 123 and 123', each has two diametrically opposite lobes 123a and one cam is advanced ninety degrees relative to the other. Thus, by rotating the shaft 124 the switch levers will be alternately actuated to open and close their respective switches.

At one side of the bracket 115 is a housing 130 into which one end of the shaft 124 extends and a pinion gear wheel 131 is fixed on this end of the shaft. Also, mounted in a wall of the housing are studs 132 and 132' on which gear wheels 133 and 133' are rotatably mounted; these latter gears being of equal size and mesh with gear wheel 131 at opposite sides thereof. Coaxial of each gear wheel 133 and 133' and fixed relative thereto for rotation of the gears, are ratchet wheels 134 and 134'. Pivotally mounted on the outer end of stud 132' is a lever arm 135 carrying a spring pressed pawl 136 which engages ratchet 133'. Likewise, pivotally mounted on the stud 132 outside of ratchet 134 is a lever 137 which, at one end, mounts a spring pressed pawl 138 which engages ratchet wheel 134, and at its other end is pivotally connected with a link 137 which has pivotal connection at its upper end with the lever 135.

The lever 137 has a stud 144 thereon coaxial of the stud 132 and extending to the outside of housing 130. Fixed on the stud is a lever 145 the end of which is disposed in position at which it will be engaged and lifted by contact therewith of a stud bolt 146 adjustably fixed on the cross head 109 when the latter moves upwardly to its upper limit of travel. There is also a vertical push rod 150 slidably mounted in guide bearings 151 and 152, respectively, in the frame 33 and housing 130 and on the lower end of the rod is a roller 154 arranged to be engaged by a cam 155 on the cross head 25 as the latter moves the ram 26 to its inner limit of travel, thereby to move the push rod upwardly against the tension of a spring 156 that surrounds the rod between a collar 157 fixed thereon and the guide bearing 151. The upper end of the push rod is arranged, on upward movement, to engage an end of lever 137 to push it upwardly.

Thus, it will be understood, by reference to Fig. 12, that when the cross head 109 moves upward with the loader plunger 100 to its upper limit of travel, the stud 146 will engage the lever arm 145 to swing the arm 137 upwardly from the dotted line position to full line position, thereby to cause the pawl 138 and ratchet 137 to advance the gear wheel 133 the predetermined interval of thirty degrees, and this causes, by reason of selected ratios of gears 133 and 131, rotation of shaft 124 an interval of forty-five degrees. Also, when the lever 145 is actuated upwardly, the lever arm 135 is pulled downwardly by the connecting link 139, then when the cross head 25 moves inwardly to advance the ram to its limit in making a briquette, the cam plate 155 engages the roller at the lower end of push rod 150 and actuates the rod upwardly against lever 137, thereby to cause lever arm 135 to move upwardly and thereby cause pawl 136 to rotatably advance ratchet 134' and gear 133' an interval whereby shaft 124 is again rotatably advanced forty-five degrees. Thus for each upward and each downward action of the loader plunger, the shaft 124 is advanced an interval of forty-five degrees, and since the cams 123 and 123' are so arranged that the lobes of one are advanced ninety degrees relative to the other, it is clear that for successive reciprocal actions of the loader plunger 100 the positions of switches 116 and 116' will be reversed and this will, in proper timing, cause dumping of charges alternately from the hoppers 13 and 14.

The control valves 39, 48 and 111 for the hydraulic cylinders 32, 44 and 105 are substantially alike in construction and mode of operation and likewise the solenoids S¹, S² and S³, whereby they are actuated, are alike in construction. Therefore, only one unit has been illustrated in detail, as in Fig. 11, with the understanding that the description of this will apply equally to the others.

Figure 3:
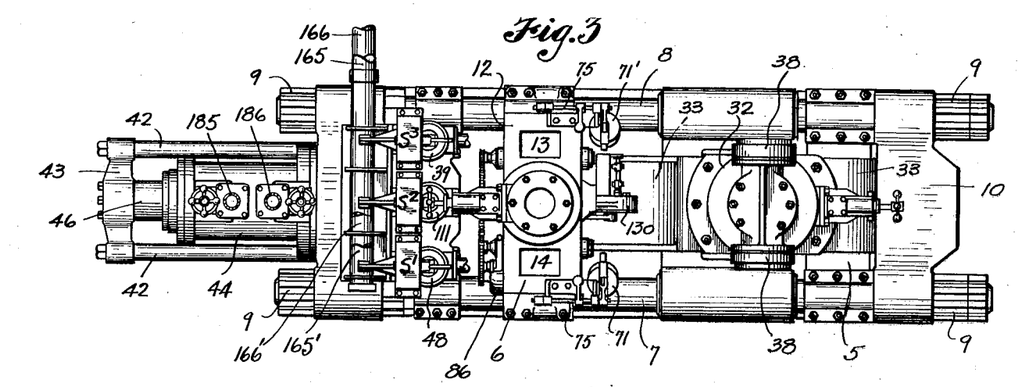
Fig. 3 is a top view of the machine.

As shown in Figs. 1 and 3, the three valve units are arranged in horizontal alinement upon a supporting base 160 upon yoke 4. Supply and exhaust pipes 165 and 166 for a hydraulic pressure medium connect with manifolds 165' and 166' which are connected, as at 167 and 168, respectively, with the inlet and outlet sides of the several valves. The diagrammatic illustration of Fig. 15 shows the piping connections between the three valves and their respective cylinders, and also shows the circuit connections between the various solenoids, which control the operations of the valves, and their circuit control switches.

Figure 11:
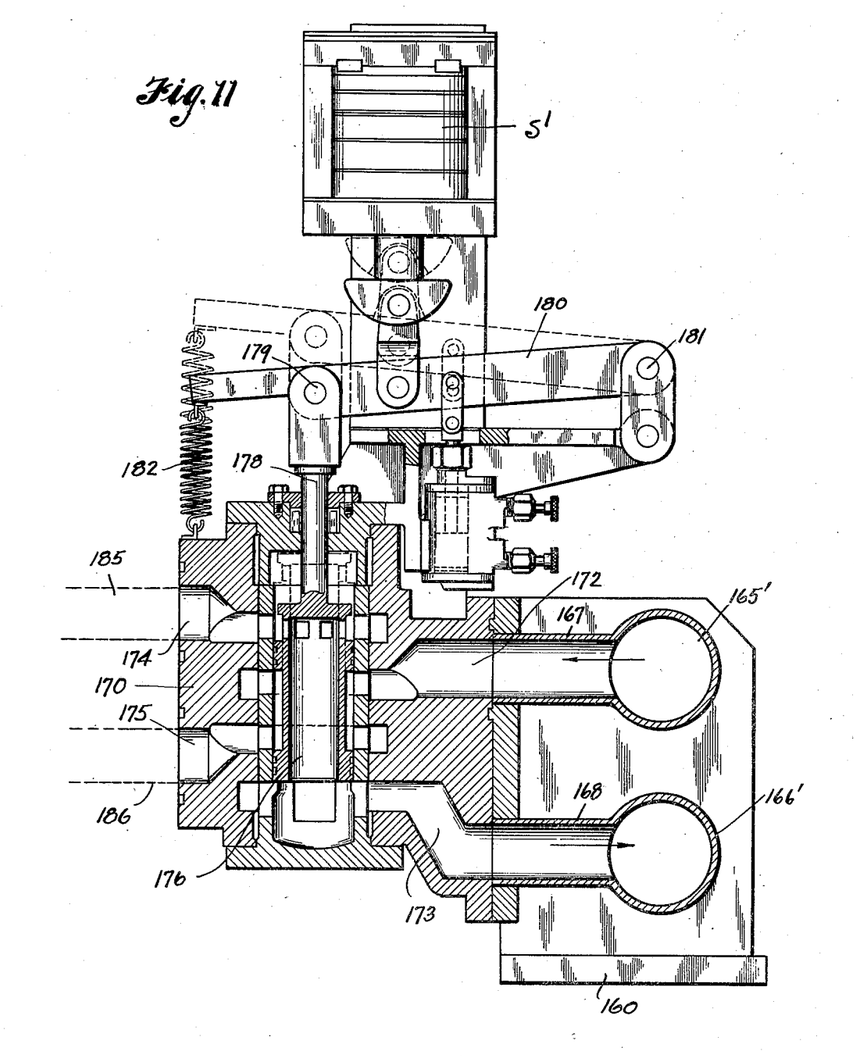
Fig. 11 is an enlarged cross sectional view of one of the control valves and its actuating solenoid.

Each valve, as shown in Fig. 11, comprises a valve housing 170 with inlet and outlet ports 172 and 173 communicating respectively with the supply and exhaust manifolds 165' and 166'. Each housing also has ports 174 and 175 whereby connection is made respectively with pipes leading to opposite ends of the hydraulic cylinder controlled by the valve, and in each housing is a reciprocally movable valve member 176 whereby the pressure medium from the supply is directed to one end of the cylinder and exhausted from its other end in accordance with movement of the valve 176 to one or the other of its limits under its solenoid control.

Each valve has its stem 178 extended therefrom and connected pivotally, as at 179, with a lever 180. The lever, in turn, is pivotally mounted at one end, as at 181, and has a spring 182 attached to its opposite end in a manner whereby the valve by reason of its connection with the lever is yieldingly held connected with the lever 180 in a manner whereby, on energization of the solenoid, the lever will be actuated against the pull of spring 182 to reverse the valve 176.

Figure 15:
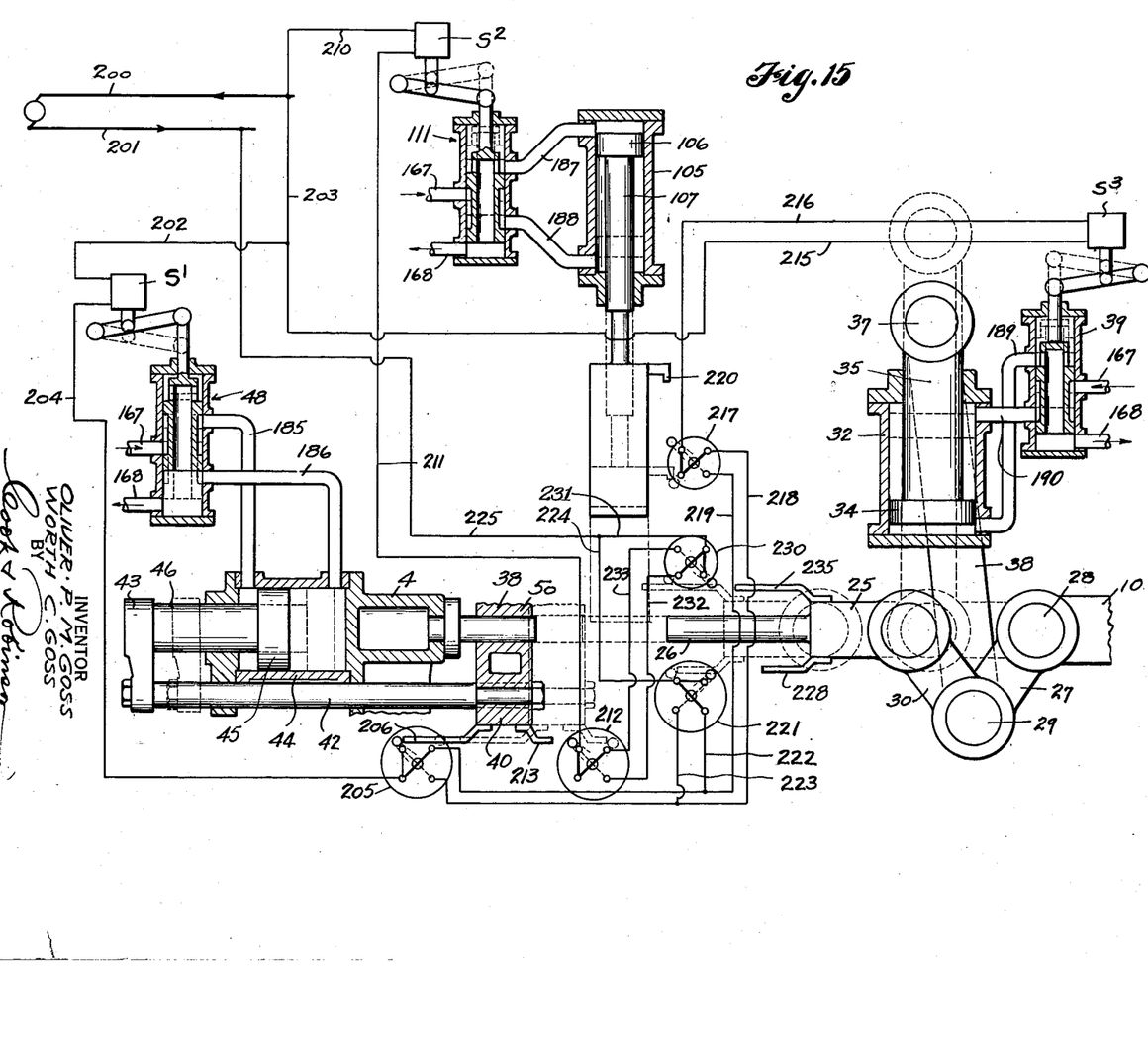
Fig. 15 is a diagrammatic showing of the various hydraulic cylinders and their pipe connections with their respective control valves; also, showing the arrangement of solenoids, circuits and switches for control of the solenoids.

By reference to Fig. 15, it is to be observed that the ports 174 and 175 of valve 48 are connected to the opposite ends of cylinder 44 by pipes 185 and 186. Likewise, valve 111 is connected to cylinder 105 by pipes 187 and 188 and valve 39 is connected to cylinder 32 by pipes 189 and 190.

In Fig. 15 is diagrammatically illustrated the location of the various control switches for the solenoids. 200 and 201, respectively, designate the mains of a supply circuit. Solenoid S¹ has a connection 202 at one side with a wire 203 which connects with main 200. It has a connection 204 at its other side to one side of a three-way switch 205 which is located in position to be actuated to circuit closing position by an arm 206 fixed to cross head 40 when the latter moves to its outer circuit in discharging a briquette.

Solenoid S² has a connection 210 at one side with circuit main 200 and it has a connection 211 from its other side to a three-way switch 212 that is located in position to be actuated by an arm 213 on cross head 40 when the cross head moves to a position whereby the press chamber 38 is disposed against the loader cylinder for receiving a charge.

Solenoid S³ has one side connected by a circuit wire 215 with the wire 203 leading to circuit main 200, and has its other side connected by a wire 216 with a three-way switch 217 with contacts thereof connected by wires 218 and 219 with poles of three-way switch 205. The switch 217 is located in position for actuation by an arm 220 on the loader plunger 100 when the latter reaches its lower limit of travel.

There is also a three-way switch 221 with poles connected by wires 222 and 223 with the wires 218 and 219 and with a connection 224 to a wire 225 leading to circuit main 201. The switch 220 is located in position to be actuated to close its circuit by an arm 228 on cross head 25 at a time when the ram has reached its inward travel for compressing a briquette. Also there is the three-way switch 230 with a connection 231 to wire 225 which leads to main 201 and with connections 232 and 233 connecting it with contacts of switch 212 so that these switches work together. The switch 230 is located in position for actuation by an arm 235 on cross head 25 when the latter has moved inwardly to an extent whereby the ram is just entering the press cylinder.

With the switches and circuits so arranged, operation of the machine under automatic control is as follows:

Assuming that the valve 48 is in adjustment whereby hydraulic medium is being admitted to the inner end of cylinder 44 and piston 45 is moving outwardly to move the cross head 40 and press chamber away from the loader cylinder. As the cross head 40 reaches its outer limit of travel, the arm 206 closes switch 205 and thereby closes a circuit through solenoid S¹ and causes reversal of valve 48 to cause piston 45 to move inwardly in cylinder 44 and cross head 40 to move the press cylinder back against the loader cylinder to receive a charge. As the cross head moves inwardly to this position, the arm 213 closes switch 212 and thereby energizes solenoid S² to cause reversal of valve 111 whereby the loader plunger 100 is caused to move downwardly to advance a charge of material from the hopper into the loader cylinder. As the plunger 100 moves downwardly, the arm 220 thereon closes switch 217 and thereby energizes solenoid S³ to cause reversal of valve 39 and an upward travel of piston 34 in cylinder 32 to operate the ram 26 to advance the charge of material from the loader cylinder into the press chamber. As the ram moves inwardly, the arm 235 on cross head 25 actuates switch 230 to open the circuit to solenoid S² thereby to permit reversal of valve 111 and a retraction of the loader plunger 100. As the ram reaches its limit of inward travel, the arm 228 on the cross head 25 actuates switch 221 and opens the circuit to solenoid S¹ and permits reversal of valve 48 and causes an outward return of the cross head 40 to starting position, and at the same time effects reversal of valve 39 to retract the ram to starting position. The cycle of operation is repeated when the arm 206 on cross head 40 again actuates switch 205.

As a feature of construction, the cross head 40 is water jacketed, as at 248 in Fig. 9, about the press cylinder 38 to avoid overheating, and flexible circulation pipes 250 and 251 connect with this jacket, as seen in Fig. 8. Also, in order that the material delivered into the hoppers may be kept in the heated condition at which it is received, the hoppers are jacketed for reception of superheated steam; the jacket being shown at 255 in Fig. 5, and suitable connection is made therewith.

In the manufacture of briquettes of the character for which the present machine is intended from sawdust or other suitable material, it is desirable to mix with the material a certain amount of a chemical salt whereby the flame produced in the burning of the briquettes will have varied colors. Such a chemical salt may be contained in hoppers, as designated at 260 in Fig. 5, and fed therefrom in predetermined amounts into the supply hopper tubes 19 and 20 in accordance with the rate of operation of the machine. Control of the delivery of the chemical salt preferably would be through the mediacy of valves in the hoppers 260 operated by the solenoid mechanism which actuates the gate valves. These valves, as designated at 261, would be of the rotary type and formed with peripheral pockets 263. The valve shafts 264 would be equipped with ratchet wheels and levers 265 pivoted on the shafts and mounting pawls 266 to engage the ratchets which are connected by links 267 with arms 268 extending from and fixed to the shafts 75 and 75'. This provides that with each operation of the solenoid, the shafts 75 and 75' are actuated in a manner to rotatably advance the valves an interval for delivery of salt from one of the pockets; this salt passing into the supply tubes leading to the hoppers. In this way the proper or a desired amount of salt may be added.

Having thus described our invention, what we claim as new therein and desire to secure by Letters Patent, is:—

1. In a briquette forming machine, a frame, a loader cylinder fixed therein, means for feeding charges of material into the loader cylinder, a stripper plunger fixed in the frame coaxially alined with the loader cylinder and with one end spaced from an end of the loader cylinder, a press cylinder slidable along the stripper plunger from a position in end to end registration with the loader cylinder to a position spaced therefrom and at which latter position the stripper extends therethrough, a ram reciprocally operable through a definite interval through the loader cylinder and extendable into the press cylinder for the advancement and compression of charges in the latter cylinder between the ends of the ram and stripper, means for shifting the press cylinder along the stripper plunger between its limits of travel, and a hammer operatively connected for actuation incident to movement of the press cylinder outwardly along the stripper plunger, to cause the hammer end to strike the briquette and disengage it from the stripper when ejected thereby from the press cylinder.

2. In a briquette forming machine, in combination, a press cylinder, a hopper, a loader cylinder having a passage opening into a side thereof and connecting the cylinder with the hopper, means for delivering charges of material from the hopper into the passage, a loader plunger reciprocally movable along the passage to advance the charges into the loader cylinder; said plunger, when in extended position, being adapted to register within the opening of the passage into the loader cylinder and having a surface conforming in curvature with that of the cylinder and flush therewith, and a ram reciprocally operable in the loader cylinder for the advancement of charges therefrom into the press cylinder.

3. In a briquette forming machine, a press cylinder, a loader cylinder, a hopper having a delivery passage to the loader cylinder, a normally closed valve in the said passage for controlling delivery of charges of material into said loader cylinder, a ram operable in said passage to deliver charges under a preliminary compression into the loader cylinder, another ram operable to advance charges from the loader cylinder into the press cylinder and means operating in timing with the movements of the first-named ram for actuating said valve to open position when the ram is extended.

4. In a briquette forming machine, a press cylinder, a loader mechanism including a loader cylinder, means for advancing charges of material thereinto, and a ram operable to deliver said charges from the loader cylinder into the press cylinder and to compress them into briquettes therein, a stripper fitted to the press cylinder, means for moving the press cylinder therealong for ejection of the briquette, devices actuated by the said last mentioned means when the press cylinder reaches the ejecting position to energize the loader mechanism, and other devices actuated in timing with the ram when it has compressed the briquette, to energize the press cylinder moving means to move the latter to ejecting position.

5. In a briquette forming machine, a loader cylinder, a loader plunger reciprocally operable for advancing charges of material into the loader cylinder, a press cylinder for receiving charges from the loader cylinder, a stripper plunger fitted to the press cylinder, means for moving the press cylinder along the stripper plunger against and away from the loader cylinder to receive a charge and for ejection of a briquette, a ram reciprocally operable through the loader cylinder and into the press cylinder for the advancement of a charge from the former into the latter and to compress it in the latter into a briquette, means operating in timing with movements of the press cylinder for controlling movement of the loader plunger, and means actuated by the loader plunger for controlling actuation of the ram.

6. A machine, as in claim 5, wherein means is actuated by the ram when it reaches its extended position to effect movement of the press cylinder along the stripper for ejection of the briquette.

7. In a briquette forming machine, a loader cylinder, a loader plunger reciprocally operable for loading of charges of material into the loader cylinder, a press cylinder arranged to receive material from the loader cylinder, a ram, means reciprocally actuating the ram between retracted and extended positions for advancement of charges from the loader into the press cylinder to form briquettes, a stripper plunger, means for shifting the press cylinder along the stripper plunger away from the loader cylinder for ejection of a briquette, reciprocally moving means for actuating the loader plunger, means operable by the press cylinder moving means for reversing the direction of movement of the press cylinder upon discharge of a briquette therefrom to return it to loading position, and means operated thereby on return of the press cylinder to loading position to effect a loading action of the loader plunger, means actuated by the loader plunger, moving means for timing the loading action of the ram, and means actuated by the ram moving means for timing the retraction of the loader plunger and for timing the retractive movements of the ram and of the press cylinder.

OLIVER P. M. GOSS.
WORTH C. GOSS.